INVENTOR.
CHARLES ALLAN SCHURR

Aug. 24, 1954  
C. A. SCHURR  
2,687,505  
CONTROL SYSTEM FOR INDUCTION MOTORS AND BRAKING GENERATORS USING SATURABLE CORE REACTORS  
Filed Feb. 28, 1952  
4 Sheets-Sheet 2
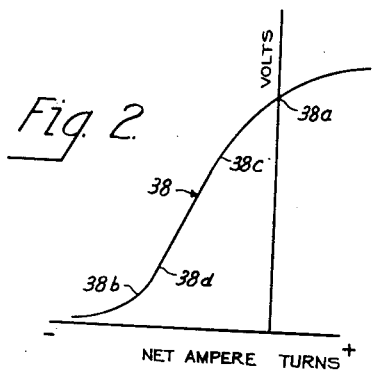
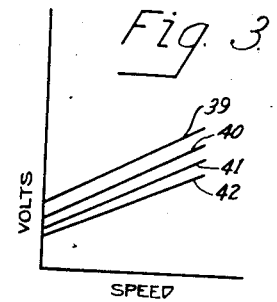
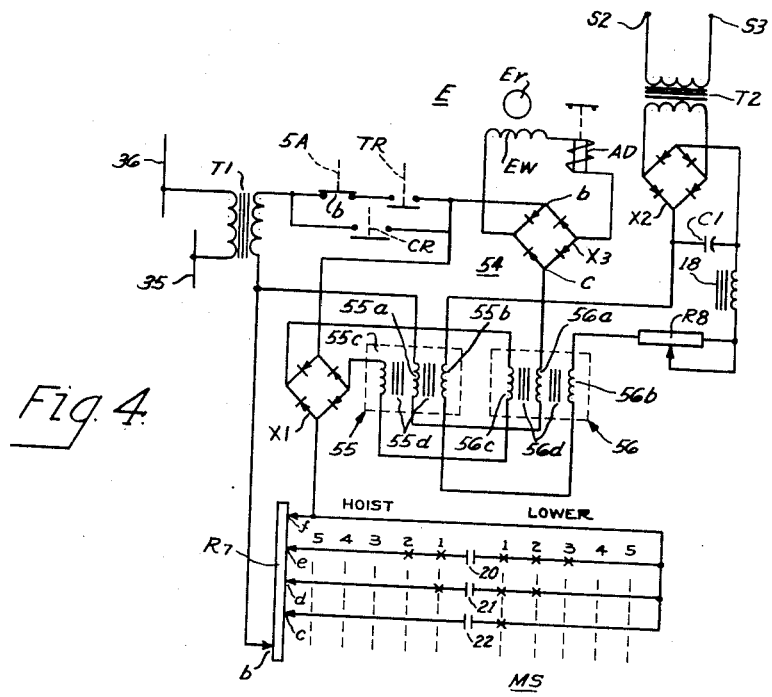
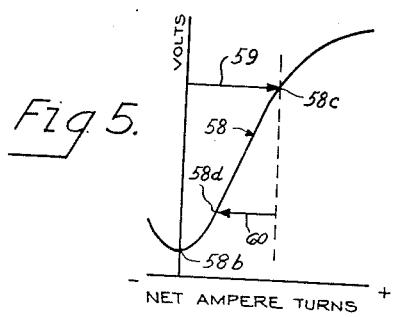
INVENTOR.  
CHARLES ALLAN SCHURR  
BY  
*John H. Leonard*  
*Harold J. Rathbun*  
his ATTORNEYS.

INVENTOR.
CHARLES ALLAN SCHURR

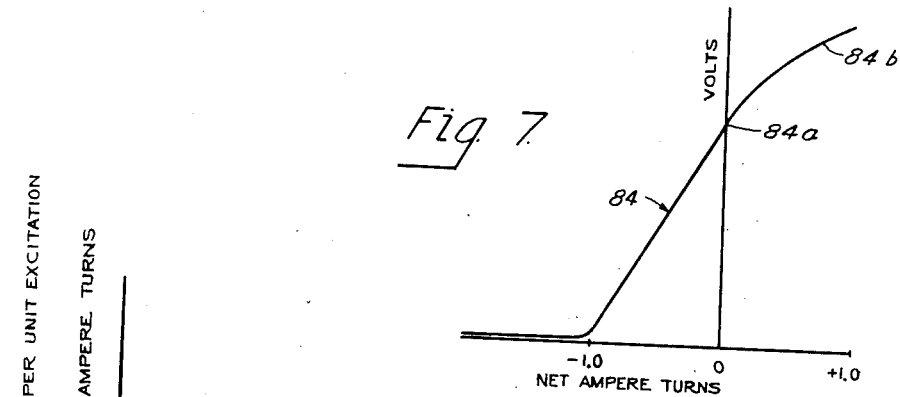
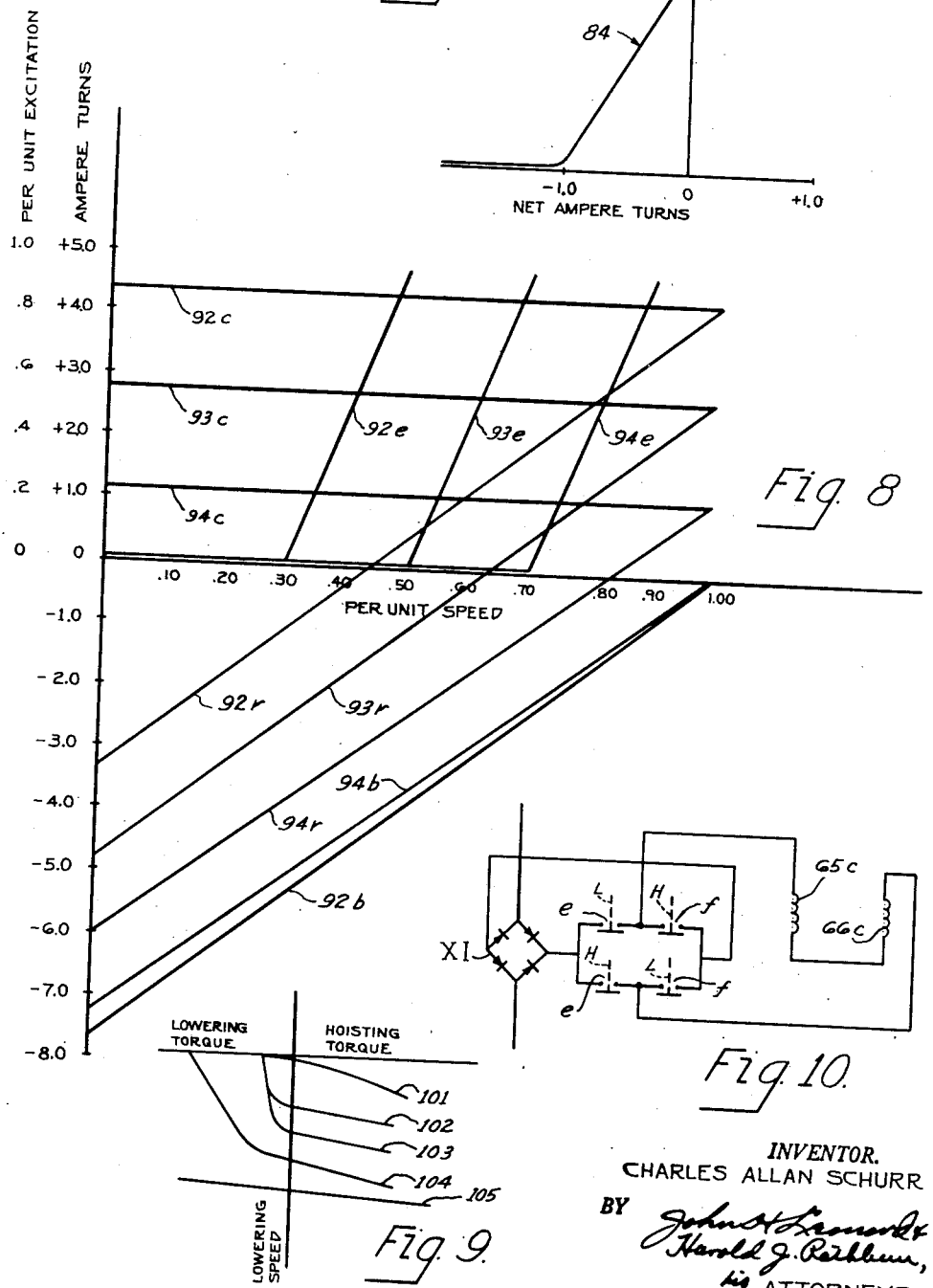
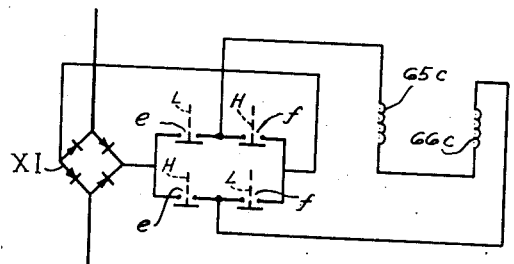

Patented Aug. 24, 1954

2,687,505

UNITED STATES PATENT OFFICE 2,687,505

CONTROL SYSTEM FOR INDUCTION MOTORS AND BRAKING GENERATORS USING SATURABLE CORE REACTORS

Charles Allan Schurr, Euclid, Ohio, assignor to The Electric Controller & Manufacturing Company, Cleveland, Ohio, a corporation of Ohio Application February 28, 1952, Serial No. 273,906

16 Claims. (Cl. 318—209)

This invention relates to systems of control for motor drives in which an electric motor, such as a polyphase wound rotor induction motor, is coupled to an artificial load and is utilized for apparatus in which the actual load at times overhauls and drives the motor and its artificial load and in which the overhauling load must be retarded to limit its speed. The invention is particularly applicable to hoist applications and is hereinafter described as applied to that use.

Braking generators are often used as artificial loads for polyphase wound rotor induction motors driving the hoist motion of cranes to give under-synchronous speed control during hoisting as well as during both power and overhauling lowering. When used for braking purposes, generators of the eddy current type, commonly referred to as "eddy current brakes", possess some advantages, such as simplicity and cost, over direct current excited squirrel cage machines and direct current shunt, series, or compound generators having external load circuits.

When excited at constant voltage, the torque output of modern eddy current brakes designed for crane hoist service reaches a predetermined maximum value at relatively low speed and, while not decreasing, nevertheless, as the speed increases, either does not increase or increases less rapidly than is desirable for most efficient braking in hoist applications. Consequently, since the lowering torque of an overload on a hoist may exceed the full load torque of the motor, safety requires that the eddy current brake, when excited at a predetermined constant voltage within its rating, have a maximum torque output considerably in excess of the full load torque of the motor. This is particularly important if the motor operates under balanced voltage conditions with a relatively large secondary resistance in any lowering speed point. In addition to the obvious disadvantages of the cost and space requirements of the larger brake, the larger brake, when excited with a constant voltage sufficient to cause adequate torque to be produced in the higher speed range of some lowering speed points, often produces too much torque for most efficient operation in the lower speed range of those speed points.

In order to overcome these disadvantages, means have been provided to increase the excitation of the eddy current brake in a direct relation to the speed of the motor in such a manner that the torque output of the brake is correlated with the torque output of the motor to provide improved operating characteristics. The improved operating characteristics result from the reduced excitation of the brake when operating in the lower speed range of a selected speed point and from the increased excitation of the brake when operating in the higher speed range of the selected speed point. By properly correlating the change in excitation of the brake for each of several speed points with the value of motor secondary resistance for the corresponding speed point, improved speed regulation throughout the entire normal and abnormal loading range is obtained for those speed points.

For instance, an eddy current brake excited by a constant voltage selected to provide adequate torque for the safe lowering of overloads produces so much torque when light loads are being lowered that considerable motor torque must be provided at slow speeds to provide adequate lowering speed for the light loads. This large motor torque results in unnecessary heating of both the motor and brake. On the other hand, the use of increased brake excitation to provide the additional brake torque required for the safe lowering of overloads and the reduction of this excitation at slow speeds permits the desired speeds of light loads to be obtained with a reduced value of motor torque or increased light load speeds with larger values of motor torque. The variable excitation permits the use of a smaller brake and the smaller brake, when excited at reduced excitation, permits still greater reductions in motor torque for adequate speed of light loads.

The variable excitation for the brake has been obtained from a brake exciting circuit means in which a variable unidirectional voltage derived from the secondary circuit of the hoist motor is combined with a larger substantially constant unidirectional reference voltage to obtain a resultant voltage. The voltage derived from the secondary circuit of the motor decreases with speed and its range of variation depends upon the amount of resistance effective in the secondary circuit. The resultant voltage increases with the speed of the motor and is impressed on the energizing winding of the brake. The brake exciting circuit means includes means which is adjusted in coordinated relationship with the changes in the secondary resistance so that the resultant voltage has a range of variation for each lowering speed point which gives the desired improved performance. Although this prior brake exciting circuit means possesses many advantages over means providing constant voltage excitation or the use of a pilot generator for providing variable excitation, its power losses require circuit components of relatively large current carrying capacity. Consequently, the prior circuit means is costly and requires considerable space.

The present invention effects a material reduction in the cost and size of the equipment required to obtain a brake exciting voltage that increases with motor speed by combining an amplifying means with a control power means arranged to be connected to a circuit of the motor and to be operative, when so connected, to provide control power to the amplifying means at a potential that depends upon an electrical condition of the circuit of the motor. The amplifying means is electrically connected to the control power means and is responsive to the potential of the control power to produce amplified power at a potential that depends upon the potential of the control power. Means are provided which are adapted to supply the amplified power to the winding means of the braking generator which is mechanically connected to the motor.

More specifically, in accordance with the invention, an amplifier such as a saturable core reactor or magnetic amplifier is provided in the circuit means that supplies current to the winding of the braking machine. Means are provided for connecting the circuit means to a source of substantially constant alternating reference voltage and for concurrently connecting the circuit means to the secondary circuit of a wound rotor hoist motor. The circuit means is thereby excited concurrently in accordance with a voltage dependent upon an electrical condition of the secondary circuit and by a substantially constant voltage. The saturable core reactor or magnetic amplifier responds to these two excitations to provide an output voltage that increases with the motor speed. In the principal embodiment when applied to a crane hoist, changes in the lowering speed are obtained by concurrently altering the secondary resistance of the motor and the range of variation of the voltage impressed on the eddy current brake. In a modification, changes in the lowering speed are obtained by altering only the range of variation of the eddy current brake excitation.

It is an object of this invention to provide an improved alternating current control system having the foregoing operating advantages.

Another object is to provide, for a motor mechanically coupled to a braking generator constituting an artificial load for the motor, an improved control system which excites the generator in relation to the speed of the motor.

A further object is to provide, for a polyphase wound rotor induction motor mechanically coupled to a braking generator constituting an artificial load for the motor, an improved control system which excites the generator in relation to an electrical condition of the secondary circuit of the motor.

A further object is to provide an improved control system which correlates the characteristics of a polyphase wound rotor induction motor and an eddy current brake excited in relation to the secondary voltage of the motor.

A further object is to provide a control system which correlates the characteristics of a polyphase wound rotor induction motor and a braking generator energized by a voltage obtained from a circuit means supplied from the secondary circuit of the motor and including an amplifier.

An additional object is to provide a control system in which control power derived from the secondary circuit of a wound rotor hoist motor at a potential that depends upon an electrical condition of the secondary circuit is amplified and impressed on an eddy current brake mechanically connected to the motor shaft.

Another object is to provide a speed control system for a wound rotor motor in which a voltage derived from the secondary circuit of the motor controls a saturable core reactor means in the supply circuit for a braking generator mechanically coupled to the motor.

Other objects and advantages will become apparent from the following description wherein reference is made to the drawings, in which:

Figs. 2 and 3 are graphs showing operating characteristics of the brake exciting circuit means of Fig. 1;

Fig. 4 is a wiring diagram showing a modified brake exciting circuit means;

Fig. 5 is a graph showing operating characteristics of the brake exciting circuit means of Fig. 4;

Figs. 7 and 8 are graphs showing operating characteristics of the brake exciting circuit means of Fig. 6;

Fig. 9 is a graph showing speed-torque relations obtainable with the control system of Fig. 6; and Fig. 10 is a fragmentary wiring diagram illustrating a modification of Fig. 6.

Figure 1:
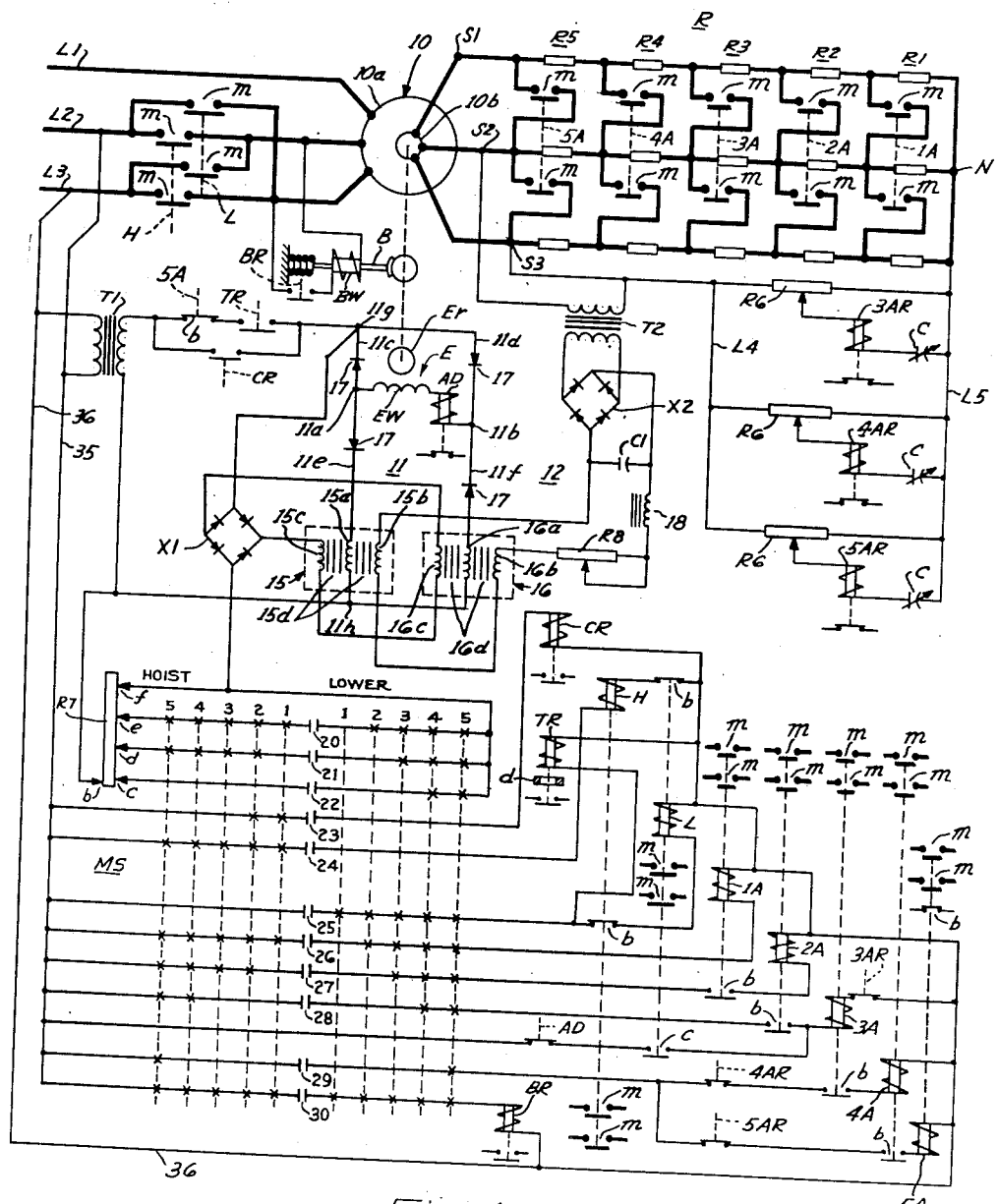
Fig. 1 is a wiring diagram illustrating the control system of this invention when connected to a motor and a braking machine such as an eddy current brake.

The control systems illustrated comprise a plurality of electromagnetic contactors and relays each of which is diagrammatically shown in the drawings. To simplify the drawings, many of the contactor and relay contacts are shown in convenient physical locations in the wiring diagrams as well as in conjunction with their respective operating windings.

Referring to Fig. 1, a polyphase wound rotor induction motor 10 which may be used for operating a hoist mechanism (not shown) has a primary winding 10a arranged to be supplied with power, for hoisting and lowering operations selectively, from a suitable source of power represented by supply lines L1, L2, and L3, and has a secondary winding 10b provided with secondary terminals S1, S2, and S3 to which is connected a balanced Y-connected resistance bank or resistor R comprising sections R1, R2, R3, R4, and R5 and a neutral point N. The secondary winding 10b and the resistor R thus constitute a secondary circuit for the motor 10.

The motor 10 is shown as provided with a suitable spring-applied, electromagnetically-released, friction brake B having an operating winding Bw preferably arranged to be connected across two of the primary terminals of the motor 10 upon closure of normally open contacts of an electromagnetic brake relay BR.

A suitable power consuming device or artificial load such as an eddy current brake E provided with a field winding Ew has its eddy current member or rotatable armature Er coupled to the shaft of the motor 10 either directly as indicated in Fig. 1 or by means of a suitable gear train (not shown). Although in the illustrated embodiments of the invention the braking machine E is shown as an eddy current brake, it will be understood that other types of generators and electric power consuming devices having suitable speed-torque characteristics, such as, for example, the newer magnetic brakes using powdered iron with or without the provision of an eddy current member, may be used to obtain many of the advantages of this invention. Preferably, the torque output of the braking machine E, when it is excited at constant voltage, increases rapidly at slow speeds and reaches substantially a maximum value at a speed less than the synchronous speed of the motor 10.

Power connections for causing the motor 10 to operate in the hoisting direction are completed upon closure of normally open main contacts m of an electromagnetic contactor H, and power connections for causing the motor 10 to operate in the lowering direction are completed upon closure of normally open main contacts m of an electromagnetic contactor L. Control of the amount of the resistor R effectively inserted in the secondary circuit of the motor 10 may be provided by a plurality of electromagnetic contactors 1A, 2A, 3A, 4A, and 5A each having a pair of normally open main contacts indicated at m for selectively short circuiting the resistor sections R1, R2, R3, R4, and R5 and each having auxiliary or control circuit contacts to be described.

A plurality of suitable relays may be provided for controlling the rate of acceleration of the motor 10 and are shown as electromagnetic, speed-responsive relays 3AR, 4AR, and 5AR connected to the secondary circuit in resonant operating circuits of the type described and claimed in Leitch Patent No. 2,165,491. Since a complete description of such resonant, relay-operating circuits in a hoist controller may be had from McArthur et al. Patent No. 2,325,413, only a brief description thereof is included herein.

Each of the resonant relay operating circuits comprises a suitable capacitor C, which may be adjustable as indicated, and a potentiometer resistor R6, the resistors R6 being connected in parallel with each other between a conductor L4 connected to the secondary terminal S3 and a conductor L5 which may be connected to the neutral point N. The operating windings of the relays 3AR, 4AR, and 5AR are connected in series with their respective capacitors C between the conductor L5 and an adjustable tap on their respective resistors R6. As explained in the aforementioned Leitch patent, the relays 3AR, 4AR, and 5AR have respective sets of normally closed contacts which open concurrently upon application of power to the primary winding 10a and which close in sequence at predetermined speeds as the motor 10 accelerates depending upon the capacity of the respective capacitors C and the adjustment of the respective resistors R6, closure of the relay contacts being caused by impairment of resonance of their respective relay circuits as the frequency of the secondary voltage of the motor 10 decreases during acceleration.

The winding Ew of the eddy current brake E is energized at certain times during operation of the motor 10 and for a time interval after deenergization of the motor 10 subsequent to a lowering operation by the unidirectional voltage appearing across output terminals 11a and 11b of a suitable amplifying means such as a magnetic amplifier 11 forming part of a brake exciting circuit means 12 and including a saturable impedance or reactor means. The saturable impedance means preferably comprises a pair of saturable impedance devices such as saturable core reactors generally designated 15 and 16 and having saturable cores 15d and 16d, respectively. The amplifier 11 has legs 11c, 11d, 11e and 11f. The legs 11c and 11d each include a suitable asymmetrical impedance device such as a rectifier element 17 and are joined at a common input terminal 11g, and the legs 11e and 11f each include a similar asymmetrical impedance device or rectifier element 17 and are joined at a common input terminal 11h. The leg 11e also includes a reactance winding 15a wound on the core 15d of the reactor 15, and the leg 11e also includes a reactance winding 16a wound on the core 16d of the reactor 16. The windings 15a and 16a are in series with their respective associated rectifier elements 17 in the legs 11e and 11f.

In addition to the amplifier 11, the brake exciting circuit means 12 comprises transformers T1 and T2, suitable full wave rectifiers X1 and X2, adjustable resistors R7 and R8, and an electromagnetic relay AD. As will become apparent, the circuit means 12 when concurrently energized by a substantially constant reference voltage and by a voltage derived from the secondary circuit of the motor 10 provides an output voltage at the terminals 11a and 11b that varies directly with the speed of the motor 10 at speeds below synchronism.

The relay AD which has its operating winding connected in series with the winding Ew between the terminals 11a and 11b of the amplifier 11 is provided to protect against excessive lowering speeds in a manner to be described should the winding Ew inadvertently become deenergized during lowering operations.

A substantially constant alternating potential is impressed at certain times across the input terminals 11g and 11h of the amplifier 11 from the secondary winding of the transformer T1 which has its primary winding arranged to be supplied from the supply lines L2 and L3. The average value of the resulting unidirectional potential appearing across the output terminals 11a and 11b of the amplifier 11 is dependent upon the degree of saturation of the cores 15d and 16d of the reactors 15 and 16. The degree of saturation of the core 15d depends upon the amount of excitation of a pair of saturating or control windings 15b and 15c wound on the core 15d, and the degree of saturation of the core 16d depends upon the amount of excitation of a pair of saturating or control windings 16b and 16c wound on the core 16d.

The control windings 15c and 16c are connected in series with each other across the direct current output terminals of the rectifier X1 which has its alternating current input terminals arranged to be connected across the secondary winding of the transformer T1. The output voltage of the rectifier X1 and accordingly the current in the control windings 15c and 16c may be controlled by an adjustable resistor R7 interposed between the lower input terminal of the rectifier X1 and the lower terminal of the secondary winding of the transformer T1. The effective value of the resistor R7 may be selected by movement of its adjustable taps b through f and by the selective operation of contacts 20, 21 and 22 of a suitable control device such as a five-position, reversing master switch MS also having contacts 23 through 30.

Normally open contacts of a suitable electromagnetic time delay or slow-to-open relay TR and normally closed auxiliary contacts b of the contactor 5A are connected in series with each other in a circuit between the upper terminal of the transformer T1 and the input terminal 11g of the amplifier 11 and are in parallel with normally open contacts of an electromagnetic control relay CR. The upper input terminal of the rectifier X1 is connected to the terminal 11g. Thus the supply of alternating potential to both the amplifier 11 and the rectifier X1 is controlled by the relays TR and CR and the contactor 5A, whereas the resistor R7 controls the magnitude of the alternating potential impressed on the rectifier X1 alone.

The control windings 15b and 16b are connected in series with each other and with an adjustable resistor R8 across the direct current output terminals of the rectifier X2 which has its alternating current input terminals connected across the secondary winding of the transformer T2 the primary winding of which is supplied from the secondary circuit of the motor 10, and as shown, is connected across the secondary terminals S2 and S3. For filtering purposes, a capacitor C1 may be connected across the output terminals of the rectifier X2 and a choke coil 18 may be connected in series with the windings 15b and 16b. The transformer T2, rectifier X2, capacitor C1, coil 18, and resistor R8 thus constitute a control power means arranged to be connected to a circuit of the motor 10, and, when so connected, to be operative to provide control power at a potential that depends upon an electrical condition of the motor circuit. In the present instance the electrical condition is the secondary voltage which varies inversely with the speed of the motor at speeds below synchronism.

From the foregoing it is seen that the circuit means 12 is concurrently supplied with control power at a substantially constant potential and with control power at a potential that varies inversely with the speed of the motor 10. As will become apparent hereinafter, the potential at the terminals 11a and 11b is a function of these two potentials, the amplifier 11 being operative to produce amplified power at a potential that depends upon the potential at the secondary terminals S2 and S3.

In the off position of the master switch MS, all of its contacts 20 through 30 are open. When the master switch MS is operated in either the hoisting or lowering direction, its contacts are open except as closure thereof is indicated by the crosses in horizontal alignment with the contacts, each cross indicating that its horizontally aligned contacts are closed for the respective position of the master switch. Thus, for example, the contacts 21 are closed in the last four hoisting positions and in the last three lowering positions, and are open in all other positions. The contacts 23 through 30 are interposed in energizing circuits for the operating windings of all of the contactors and for the relays BR, CR, and TR and extending between conductors 35 and 36 which are connected to the supply lines L2 and L3, respectively.

It will be understood that the usual undervoltage relay circuit, disconnecting switches, overload relays, fuses, and the like, may be added to Fig. 1 as is well known in the art. Before considering the operation of the control system of Fig. 1 in detail, its general functions will be explained with reference to Figs. 2 and 3.

The effect of the amount of excitation of the control windings 15b, 15c, 16b, and 16c of the reactors 15 and 16 on the potential across the output terminals 11a and 11b of the amplifier 11 is illustrated by a curve 38 of Fig. 2 wherein the voltage at the terminals 11a and 11b for a selected value of alternating potential at the input terminals 11g and 11h is plotted against the net positive or negative ampere turns produced by the windings 15b, 15c, 16b and 16c. The shape of the curve 38 and its position with respect to its axes is determined by the dimensions and magnetic characteristics of the iron in the cores 15d and 16d and by the conductivity of the rectifier elements 17 as is well known in the art. Although a curve for a specific amplifier is shown in Fig. 2, it will be understood that amplifiers having similar but not necessarily identical characteristics may be used instead, if desired.

A point 38a where the curve 38 crosses the voltage axis indicates the voltage at the terminals 11a and 11b when the net control excitation or ampere turns are zero, and the region 38b of the curve 38 indicates the voltage at the terminals 11a and 11b when the net control excitation is at a relatively large value negatively. Preferably, the windings 15b and 15c and the windings 16b and 16c are so wound and are energized at such polarity that each produces negative ampere turns, which, for each reactor, may be added arithmetically to determine the net negative control ampere turns acting on the core 15d or 16d as the case may be. Since the windings 15b and 16b are in series and, in the present instance, have the same number of turns and since the windings 15c and 16c are in series and, in the present instance, have the same number of turns, the electrical condition of each of the reactors 15 and 16 varies in the same manner.

Since the potential across the secondary terminals S2 and S3 is zero at synchronous speed, the ampere turns produced by the windings 15b and 16b is zero at that time. Under these conditions, the voltage at the terminals 11a and 11b is determined by the excitation of the windings 15c and 16c alone, and, preferably, the various values of excitation of the windings 15c and 16c obtained by selective operation of the contacts 20, 21 and 22 are such that the voltage at the terminals 11a and 11b would be in the region 38c just below the upper knee of the curve 38 were the motor 10 operating at its synchronous speed.

When the motor 10 is at standstill and its primary winding 10a is connected to the supply line L1, L2 and L3, the voltage across the secondary terminals S2 and S3 has a known value which depends upon the amount of the resistor R effective in the secondary circuit. Under these conditions the voltage at the terminals 11a and 11b is determined by the sum of the ampere turns produced by the windings 15b, 15c, 16b and 16c, which sum preferably is of such a negative value that the voltage at the terminals 11a and 11b is in the region 38d just above the lower knee of the curve 38, the exact value of this voltage for a given position of the master switch MS being dependent upon the effective value of the resistors R, R7 and R8.

Consequently, as the motor 10 accelerates from standstill towards its synchronous speed, the voltage impressed on the eddy current brake winding Ew increases from a value within the region 38d to a value within the region 38c. Since the portion of the curve 38 between the regions 38c and 38d is substantially linear and since the voltage at the terminals S2 and S3 is practically inversely proportional to the speed of the motor 10, the voltage impressed on the winding Ew varies directly with the speed. The variation of this voltage with speed for several different adjusted values of the resistor R7 and for different values of the secondary resistor R are illustrated in Fig. 3 wherein the voltage at the winding Ew is plotted against the speed of the motor 10. As will be explained more in detail later, curves 39, 40, 41 and 42 of Fig. 3 show the variation in voltage at the brake winding Ew in the first four lowering positions of the master switch MS, respectively, the curves 40 and 41 also showing the variation of this voltage in the first two hoisting positions, respectively.

Considering now the detailed operation of the control system of Fig. 1, in the first hoisting position of the master switch MS, the contacts 23, 24, 26 and 30 are closed and complete the energizing circuits for the relay CR, the contactor H, the contactor 1A, and the relay BR, respectively, the circuit for the contactor H including normally closed auxiliary contacts b of the contactor L. When these circuits are completed, the relay CR closes its contacts to connect the rectifier X1 and the amplifier 11 to the transformer T1, the contactor H closes its main contacts m to connect the motor 10 for hoisting operations, the contactor 1A closes its main contacts m to short-circuit the resistor section R1, and the relay BR closes its contacts to complete the energizing circuit for the winding Bw of the brake B which thereupon releases.

Immediately after the contacts m of the contactor H close, the relays 3AR, 4AR and 5AR pick-up to open their respective contacts, and the transformer T2 supplies an alternating potential to the rectifier X2 causing a direct current to flow in the control windings 15b and 16b. In the first hoisting position of the master switch MS, the contacts 20 are also closed and short circuit the portion of the resistor R7 between its tap e and f. The resulting excitation of the control windings 15b, 15c, 16b and 16c is such that the voltage impressed on the winding Ew varies with the speed of the motor 10 as shown by the curve 40 of Fig. 3.

In the second hoisting position of the master switch MS, the contacts 27 close to complete the energizing circuit for the contactor 2A through now closed normally open auxiliary contacts b of the contactor 1A. The contactor 2A thereupon closes its main contacts m to short circuit the additional resistor section R2 which causes the torque of the motor 10 to increase. Also, in the second hoisting position, the contacts 21 of the master switch MS close to short circuit the portion of the resistor R7 between its taps d and f. Since the amount of resistance in the circuit between the transformer T1 and the rectifier X1 has now been decreased, the negative ampere turns produced by the windings 15c and 16c is increased. This causes the excitation of the brake winding Ew to be less for any given speed of the motor 10 than when the master switch MS is in the first hoisting position, and may be as indicated by the curve 41 of Fig. 3. The resultant torque available to hoist a load consequently increases. The voltage at the secondary terminals S2 and S3 decreased for any given speed of the motor 10 when the contactor 2A operated, resulting in a corresponding decrease in the negative ampere turns produced by the windings 15b and 16b, and this decrease is taken into account in selecting the position of the tap d along the resistor R7.

In the third hoisting position, the contacts 23 of the master switch MS open to effect deenergization of the relay CR which thereupon opens its contacts to disconnect the winding Ew from its source of energization. The windings 15c and 16c are also deenergized. Since the eddy current brake E is now deenergized, the torque available at the motor shaft for hoisting a load increases.

In the fourth hoisting position of the master switch MS, the contacts 28 in the energizing circuit for the contactor 3A close. When the speed of the motor 10 reaches a predetermined value, or if it is already at that value, the relay 3AR closes its contacts. The energizing circuit for the contactor 3A is then completed through the contacts 28, the contacts of the relay 3AR, and now closed normally open auxiliary contacts b of the contactor 2A. The resultant closure of the contacts m of the contactor 3A short circuits the additional resistor section R3 and the torque of the motor 10 again increases.

Movement of the master switch MS to its last hoisting position closes the contacts 29 in the energizing circuits for the contactors 4A and 5A. When the speed of the motor 10 reaches a predetermined value, the relay 4AR closes its contacts to complete the circuit for the contactor 4A through the contacts 29, the contacts of the relay 4AR, and now closed normally open auxiliary contacts b of the contactor 3A. The resultant closure of the contacts m of the contactor 4A short circuits the additional resistor section R4 which causes the motor 10 to accelerate until a speed is reached at which the relay 5AR closes its contacts to complete the energizing circuit for the contactor 5A through the contacts 29, the contacts of the relay 5AR, and now closed normally open auxiliary contacts b of the contactor 4A. The contactor 5A thereupon responds to short circuit all of the secondary resistor R. The motor 10 now exerts its maximum hoisting torque.

Return of the master switch MS from the last hoisting position to the off position results in a switching sequence opposite to that just described. When the off position is reached, the motor 10, the brake B, and the eddy current brake E are all deenergized and the load is held in the elevated position by the brake B. The relay AD operates whenever the eddy current brake is energized in hoisting but performs no function because normally open auxiliary contacts c of the contactor L are open.

In the first lowering position of the master switch MS, the contacts 30 and 25 close to complete, respectively, the energizing circuits for the relay BR and for the contactor L, the latter circuit being through normally closed auxiliary contacts b of the contactor H. The contactor L thereupon responds to close its main contacts m to connect the motor 10 for lowering operations, and the relay BR responds to close its contacts causing the brake B to release. The motor 10 is now connected for lowering operations with all of the resistor R effective in the secondary circuit. Closure of the contacts 25 also completes the energizing circuit for the time delay relay TR which thereupon closes its contacts immediately to connect the amplifier 11 and the rectifier X1 to the transformer T1.

As soon as the contacts m of the contactor L close, the relays 3AR, 4AR, and 5AR pick up to open their respective normally closed contacts. The contacts of the relay 3AR open so quickly after the main contacts m of the contactor L close that an emergency overspeed protection circuit from the conductor 35 through the contacts of the relay AD, the auxiliary contacts c of the contactor L, the operating winding of the contactor 3A, and the contacts of the relay 3AR is opened by the latter contacts before the contactor 3A can respond.

Also, in the first lowering position, the contacts 20, 21 and 22 are open so that all of the resistor R7 between its taps b and f is in series with the rectifier X1 and consequently the negative ampere turns provided by the windings 15c and 16c is relatively low. Accordingly, the winding Ew is energized as indicated by the curve 39 of Fig. 3.

As soon as a relatively low value of excitation current starts to flow through the winding Ew, the relay AD operates to open its normally closed contacts which are connected in series in the previously traced overspeed protection circuit including the coil of the contactor 3A. As mentioned, this circuit is interrupted by opening of the contacts of the relay 3AR as soon as power is applied to the primary of the motor 10 and prior to operation of the contactor 3A. As soon as the speed of the motor 10 reaches a speed higher than the speed setting of the relay 3AR, the relay 3AR drops out and closes its contacts. A speed high enough to cause drop out of the relay 3AR before the master reaches the third lowering position can be reached only if the excitation of the eddy current brake E has failed which would cause closure of the relay AD. Thus drop out of the relay 3AR under these conditions causes emergency operation of the contactor 3A which removes sufficient resistance from the secondary circuit to limit the speed of the motor 10 to a safe value by regenerative braking.

In the second lowering position of the master switch MS, the contacts 26 close to complete the energizing circuit for the contactor 1A which thereupon closes to short circuit the resistor section R1, and the contacts 20 of the master switch MS close to short circuit the portion of the resistor R7 between its taps e and f which causes an increase in the excitation of the windings 15c and 16c so that the voltage impressed on the winding Ew varies as indicated by the curve 40 of Fig. 3.

In the third lowering position of the master switch MS, the contacts 27 close to complete the energizing circuit for the contactor 2A through the now closed auxiliary contacts b of the contactor 1A. The contactor 2A thereupon closes its contacts m to short circuit the additional resistor section R2 which causes the motor 10 to increase its torque. Also, in the third lowering position, the contacts 21 close to short circuit the portion of the resistor R7 between its taps d and f which causes a further increase in the excitation of the windings 15c and 16c resulting in a reduction in the voltage across the winding Ew to the values indicated by the curve 41 of Fig. 3.

In the fourth lowering position of the master switch MS, the contacts 28 close to partially complete the energizing circuit for the contactor 3A through the now closed auxiliary contacts b of the contactor 2A which circuit is completed upon closure of the contacts of the relay 3AR when a predetermined speed is reached. Response of the contactor 3A causes the additional resistor section R3 to be short circuited and the motor torque consequently increases. Also, in the fourth lowering position, the contacts 22 close to leave only the portion of the resistor R7 between its taps b and c in series with the rectifier X1 so that the voltage across the winding Ew varies as indicated by the curve 42 of Fig. 3. The voltage at the secondary terminals S2 and S3 decreased for any given speed of the motor 10 when the contactor 3A operated, resulting in a corresponding decrease in the negative ampere turns produced by the windings 15b and 16b, and this decrease is taken into account in selecting the position of the tap c along the resistor R7.

Movement of the master switch MS to the fifth lowering position partially completes the energizing circuits for the contactors 4A and 5A. The circuit for the contactor 4A is completed through the now closed auxiliary contacts b of the contactor 3A upon closure of the contacts of the relay 4AR, and the contacts m of the contactor 4A thereupon close to short circuit the additional 4A resistor section R4 causing a further increase in the torque of the motor 10. Since the contacts 22 remain closed in the fifth lowering position, the excitation of eddy current brake E is not greatly altered upon operation of the contactor 4A. When a speed is reached causing the relay 5AR to drop out, the contactor 5A is energized through the contacts of the relay 5AR and the now closed auxiliary contacts b of the contactor 4A and responds to short circuit all of the secondary resistor R. Opening of the normally closed auxiliary contacts b of the contactor 5A disconnects the winding Ew from its source of energization, and the brake E no longer exerts a retarding torque. Overhauling loads are now lowered by regenerative braking alone.

Upon return of the master switch MS from any one of its lowering positions to its off position, the contactors L and 1A through 5A and the relays TR and BR are deenergized. Since the contacts of the time delay TR remain closed for a time interval after deenergization of its operating winding, due for example, to a copper sleeve d about its core, the brake E remains excited for a predetermined time interval after the master switch MS is returned to the off position and assists the friction brake B in bringing the load to a stop. The degree of excitation of the brake E at this time is relatively large since it is determined by the degree of excitation of the windings 15c and 16c alone, the windings 15b and 16b having been deenergized as soon as the contactor L opened. The windings 15c and 16c remain energized as in the first lowering point since the contacts 20, 21 and 22 are open.

Although in the control system as illustrated in Fig. 1, adjustable voltages have been taken only from the resistor R7 in order to obtain the spread in the resultant voltages 39 through 42, it is apparent that taps on the resistor R8 could be provided instead for this purpose, or taps on both resistors could be utilized.

It is also apparent that one or more steps of unbalanced voltage braking could be provided for the motor 10 with or without assistance from the braking generator.

Although, in the illustrative embodiment of Fig. 1, the same acceleration relays are used during both hoisting and lowering and are arranged to operate at the same selected speeds, respectively, whether lowering or hoisting, means could be provided to alter the operating characteristics of the relays for lowering control or separate relays and relay circuits could be used for hoisting and lowering as is well known in the art.

Fig. 4 illustrates a modified brake exciting circuit means 54 which may be used instead of the brake exciting circuit means 12 of Fig. 1. Circuit elements which may be the same in Fig. 1 and Fig. 4 are identified by the same reference characters. The brake exciting circuit means 54 comprises the transformer T1 and T2, the rectifiers X1 and X2, the resistors R7 and R8, a suitable full wave rectifier X3, the relay AD, and a magnetic amplifier comprising a pair of suitable saturable electromagnetic devices such as the preferably identical saturable core reactors 55 and 56.

The winding Ew of the eddy current brake E in Fig. 4 is connected in series with the operating winding of the relay AD across the direct current output terminals of the rectifier X3. An alternating current terminal b of the rectifier X3 is arranged to be connected to the upper terminal of the secondary winding of the transformer T1 through a circuit including the normally open contacts of the relay TR in series with the normally closed auxiliary contacts b of the contactor 5A, the series connected contacts being paralleled by the normally open contacts of the relay CR. The other alternating current terminal c of the rectifier X3 is connected to the lower terminal of the secondary winding of the transformer T1 through series connected impedance windings 55a and 56a of the saturable core reactors 55 and 56 which have saturable cores 55d and 56d, respectively. Thus, upon variation of the impedance of the windings 55a and 56a, the alternating voltage impressed on the rectifier X3 varies thereby causing the excitation of the winding Ew to vary.

Variable saturating or control excitation is provided for the reactors 55 and 56 by respective control windings 55b and 56b wound on the cores 55d and 56d, respectively, and connected in series with each other and the resistor R8 across the direct current output terminals of the rectifier X2 which is supplied through the transformer T2 from the secondary terminals S2 and S3. Adjustable values of substantially constant saturating or control excitation is provided for the reactors 55 and 56 by respective control windings 55c and 56c wound on the cores 55d and 56d, respectively, and connected in series with each other across the direct current output terminals of the rectifier X1 which is supplied from the transformer T1 through the adjustable resistor R7. The effective value of the resistor R7 is controlled by the contacts 20, 21 and 22 of the master switch MS only part of which is illustrated in Fig. 4. The portion of the master switch MS not shown in Fig. 4 may be arranged in the same manner as in Fig. 1, but the contacts 20, 21 and 22 are arranged to operate in a different sequence as indicated.

The effect of the degree of excitation of the control windings 55b, 55c, 56b and 56c on the output voltage of the rectifier X3 is illustrated by a curve 58 in Fig. 5 wherein voltage at the terminals of the winding Ew is plotted against the net ampere turns produced by the windings 55b, 55c, 56b, and 56c for a selected value of voltage at the transformer T1. The shape of the curve 58 and its position relative to its axes is determined by selection of the material of the cores 55d and 56d and by their cross sectional area as is well known in the art. A point 58b where the curve 58 crosses the voltage axis indicates the voltage at the winding Ew when the net excitation of the control windings 55b, 55c, 56b and 56c is zero. As the net ampere turns in the control windings increases in the positive direction, the curve 58 shows that the voltage at the winding Ew increases toward a limiting maximum value of voltage. Preferably the control windings 55b, 55c, 56b and 56c are so wound and are of such relative polarity that the ampere turns produced by the windings 55b and 56b are negative while the ampere turns produced by the windings 55c and 56c are positive.

At synchronous speed of the motor 10, the ampere turns in the windings 55b and 56b are zero, and consequently, the voltage at the winding Ew in Fig. 4 is determined by the positive ampere turns in the windings 55c and 56c alone. Preferably the range of adjustment of the resistor R7 is such that the positive ampere turns in the windings 55c and 56c is such that the voltage at the winding Ew is in the region 58c below the upper knee of the curve 58 at synchronous speed of the motor 10, one example of such excitation being indicated by the horizontal arrow 59. The resistor R8 may be so adjusted that when the motor 10 is at standstill, the negative ampere turns in the windings 55b and 56b is as indicated by the horizontal arrow 60. The differential or resultant excitation at standstill is then as indicated by the point 58d. Accordingly, since the excitation produced by the windings 55b and 56b decreases as the speed of the motor 10 increases, the voltage at the winding Ew increases with speed.

In the first lowering position, the contacts 20, 21 and 22 of the master switch MS in Fig. 4 are closed, and the total ampere turns in the windings 55c and 56c is a maximum so that the range of voltage at the winding Ew is as indicated by the curve 39 of Fig. 3. In the second, third and fourth lowering positions the contacts 22, 21 and 20 open in sequence as indicated, and the range of the voltage as the winding Ew decreases in steps as indicated by the curves 40, 41 and 42, respectively, of Fig. 3.

The first and second hoisting positions of the master switch MS in Fig. 4 are the same with respect to the operation of the contacts 20, 21 and 22 as are the second and third lowering positions, respectively.

Figure 6:
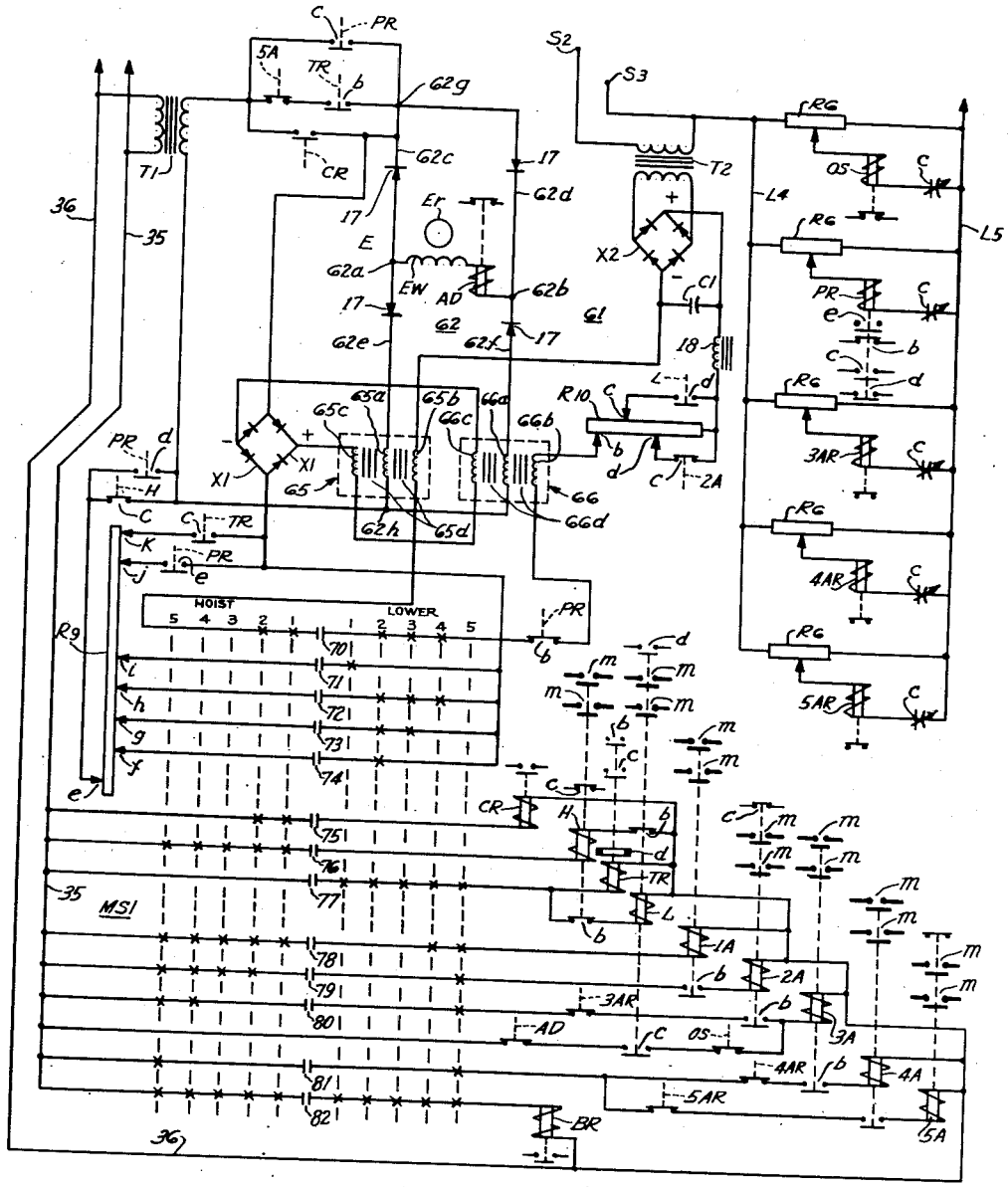
Fig. 6 is a wiring diagram illustrating a modified control system.

Fig. 6 illustrates a hoist controller incorporating a brake exciting circuit means 61 similar to the brake exciting circuit means 12 of Fig. 1, but modified for cooperation with a different sequence of acceleration contactor operation during lowering operations. The power circuits for the motor 10 have been omitted from Fig. 6 since they may be the same as those of Fig. 1. Circuit elements which may be the same in Fig. 1 and Fig. 6 are identified by the same reference characters. The brake exciting circuit means 61 comprises adjustable resistors R9 and R10, the transformers T1 and T2, the rectifiers X1 and X2, the relay AD, and a suitable amplifying means such as a magnetic amplifier 62 including saturable core reactors 65 and 66.

The amplifier 62 has output terminals 62a and 62b, legs 62c, 62d, 62e and 62f each including one of the rectifier elements 17, and input terminals 62g and 62h. The winding Ew of the eddy current brake E is connected across the terminals 62a and 62b in series with the operating winding of the relay AD, and the terminals 62g and 62h are arranged to be connected across the secondary winding of the transformer T1 under the control of the relays CR and TR and the auxiliary contacts b of the contactor 5A as in Fig. 1, and in addition by normally open contacts c of a plugging relay PR to be described.

The leg 62e also includes an impedance winding 65a of the reactor 65 wound on a core 65d, and the leg 62f also includes an impedance winding 66a of the reactor 66 wound on a cord 66d. A pair of saturating or control windings 65b and 66b wound on the cores 65d and 66d of the reactors 65 and 66, respectively, are connected in series with each other and with the adjustable resistor R10 across the output terminals of the rectifier X2 when contacts 70 of a master switch MS1 and contacts b of the plugging relay PR are closed. The resistor R10 has intermediate adjustable taps b, c, and d. The master switch MS1 also has contacts 71 through 82. A pair of saturating or control windings 65c and 66c wound on the cores 65d and 66d of the reactors 65 and 66, respectively, are connected in series with each other across the direct current output terminals of the rectifier X1. The alternating potential applied to the rectifier X1 may be adjusted by means of the adjustable resistor R9 having intermediate taps e through k, the taps i, h, g, and f being connected to the contacts 71 through 74, respectively, of the master switch MS1.

The conductors L4 and L5 are arranged to supply resonant operating circuits for the relays 3AR, 4AR and 5AR as in Fig. 1 and also for the plugging relay PR and for an overspeed relay OS. The circuit for the relay OS is adjusted to cause the relay OS to pick up as soon as primary power is applied to the motor 10 and to cause the relay OS to drop out just before the motor 10 reaches its synchronous speed. The circuit for the relay PR is adjusted to cause the relay PR to remain dropped out so long as the secondary frequency, that is, the frequency of the voltage across the terminals S2 and S3, is less than the primary frequency, that is, the frequency of the voltage at the supply lines L1, L2 and L3. The circuit for the relay PR is further adjusted to cause the relay PR to pick up when the secondary frequency becomes greater than the primary frequency which occurs when the motor 10 is plugged, and to cause the relay PR to drop out just prior to the instant when the secondary frequency decreases to become equal to the primary frequency.

The effect of the degree of excitation of the control windings 65b, 65c, 66b and 66c on the potential across the terminals 62a and 62b of the amplifier 62 is illustrated by a curve 84 of Fig. 7 wherein the voltage across the terminals 62a and 62b is plotted against the net ampere turns in the windings 65b, 65c, 66b and 66c for a selected value of alternating voltage at the terminals 62g and 62h. A point 84a where the curve 84 crosses the voltage axis indicates the voltage at the terminals 62a and 62b when the net excitation or ampere-turns of the control windings 65b, 65c, 66b and 66c is zero.

Further understanding of the circuit elements of the controller of Fig. 6 will be had from the following description of its operation.

In the first hoisting position of the master switch MS1, the contacts 70, 75, 76, 78 and 82 are closed. Closure of the contacts 76 effects closure of the contactor H to cause the motor 10 to exert a hoisting torque, closure of the contacts 78 effects closure of the contactor 1A to select a desirable hoisting torque output for the motor 10, and closure of the contacts 82 effects closure of the relay BR which causes the brake B to release. Closure of the contacts 75 effects closure of the relay CR which connects the rectifier X1 and the amplifier 62 to the transformer T1, and closure of the contacts 70 completes the circuit to the windings 65b and 66b from the rectifier X2.

Closure of the contactor H caused opening of its normally closed auxiliary contacts c which are interposed between the transformer T1 and the rectifier X1. This prevents energization of the windings 65c and 66c during hoisting operations so that the control excitation of the reactors 65 and 66 is provided only by the windings 65b and 66b which are so wound and are so connected to the rectifier X2 as to provide negative ampere turns. The taps b and d of the resistor R10 are so adjusted that, with the normally open auxiliary contacts d of the contactor L open and the normally closed auxiliary contacts c of the contactor 2A closed, the negative ampere turns in the windings 65b and 66b when the motor 10 is at standstill is sufficient to limit the excitation of the eddy current brake E to a relatively low value. As the motor 10 accelerates in the hoisting direction, the voltage at the secondary terminals S2 and S3 decreases to cause a decrease of the negative ampere turns in the windings 65b and 66b resulting in an increase in the excitation of the winding Ew as is apparent from the slope of the curve 84. Preferably the standstill torque of the motor 10 with the contactor 1A closed is in the neighborhood of full load torque, and the excitation of the brake E is such that its torque is sufficient to cause an empty hook to hoist at about thirty percent of synchronous speed.

In the second hoisting position of the master switch MS1, the contacts 79 close to cause the contactor 2A to close its main contacts m which short circuit the additional section R2 of the resistor R and to open its auxiliary contacts c which effect an increase in the effective value of the resistor R10 by removing the short circuit between the tap d and the positive terminal of the resistor R10. This causes an increase in the ampere turns in the windings 65b and 66b per volt at the secondary terminals S2 and S3. Consequently, as the motor 10 accelerates, the excitation of the eddy current brake E increases from a lower value than in the first hoisting position. Preferably the excitation of the brake E in the second hoisting position is selected with respect to the torque of the motor 10 that speeds intermediate of the first and third hoisting position speeds are obtained for most loads.

In the third hoisting position of the master switch MS1, the contacts 70 open to effect deenergization of the windings 65b and 66b, and the contacts 75 open to cause the relay CR to disconnect the amplifier 62 and the rectifier X1 from the transformer T1. The eddy current brake E is now deenergized and the speed of the motor 10 accordingly increases.

Operation upon movement of the master switch MS1 to the fourth and fifth hoisting positions is as described in connection with Fig 1.

In the first lowering position of the master switch MS1, the contacts 71, 77 and 82 are closed. Closure of the contacts 77 effects closure of the main contacts m of the contactor L and closure of the contacts 82 effects closure of the contacts of the relay BR. The motor 10 is now connected for lowering operations with all of the resistor R in its secondary circuit and exerts a relatively low torque. The relay TR also closes its normally open contacts b and c immediately upon closure of the contacts 77. Closure of the contacts b of the relay TR connects the terminal 62g of the amplifier 62 and the upper terminal of the rectifier X1 to the upper terminal of the transformer T1 and closure of the contacts c of the relay TR connects the lower terminal of the rectifier X1 to the tap k of the resistor R9, the tap e of which is connected to the lower terminal of the transformer T1 through the now closed contacts c of the contactor H. Closure of the contacts 71 short circuits the portion of the resistor R9 between its taps i and k thereby to select a suitable excitation for the windings 65c and 66c. Since the contacts 70 are open, the windings 65b and 66b are not energized, and the voltage at the terminals 62a and 62b is controlled by the windings 65c and 66c alone. The windings 65c and 66c are so wound and are connected to the rectifier X1 at such polarity that the ampere turns provided thereby are positive as applied to the graph of Fig. 7. The excitation provided by the windings 65c and 66c under these conditions preferably is such that the brake E is excited at a voltage indicated by a point 84b on the curve 84 thereby to provide a relatively slow first point lowering speed.

In the second lowering position of the master switch MS1, the contacts 71 open and the contacts 70, 72, 73 and 74 close. Since the normally open auxiliary contacts d of the contactor L are now closed, only the portion of the resistor R19 between its taps c and b is effective, and closure of the contacts 70 causes the windings 65b and 66b to be energized to provide negative ampere turns as indicated by a curve 92b of Fig. 8, wherein ampere turns in the windings 65b, 65c, 66b and 66c are plotted against the speed of the motor 10. Closure of the contacts 74 reduces the effective value of the resistor R9 to the value of the portion thereof between its taps e and f so that the windings 65c and 66c receive the substantially constant excitation indicated by a curve 92c of Fig. 8. The net ampere turns thus vary as indicated by the curve 92r which is the algebraic sum of the curves 92b and 92c. The curve 92r shows that the net control ampere turns of the amplifier 62 are negative and less than −1.0 until a speed of about 30 percent of synchronous speed is reached. The excitation of the brake Ew is at a low value until this speed is reached as indicated by an excitation curve 92e and then increased rapidly as can be seen by applying the ampere turn values determined from the curve 92r to the curve 84 of Fig. 7.

In the third lowering position of the master switch MS1, the contacts 74 open to insert the portion of the resistor R9 between its taps e and g in series with the rectifier X1 resulting in a decrease in the ampere turns of the windings 65c and 66c to the value indicated by a curve 93c of Fig. 8. Since the secondary resistance R has not been altered, the curve 92b of Fig. 8 shows the ampere turns produced by the windings 65b and 66b and a curve 93r indicates the net ampere turns. The brake excitation now remains at a low value until a speed close to 50 percent of synchronism is reached and then increases rapidly as indicated by a curve 93e.

In the fourth lowering position of the master switch MS1, the contacts 73 open to effect a further decrease in the ampere turns in the windings 65c and 66c to the values indicated by a curve 94c, and the contacts 78 close to effect closure of the main contacts m of the contactor 1A. The resultant reduction in the effective resistance of the resistor R causes the ampere turns in the windings 65b and 66b to decrease to the values given by a curve 94b, a curve 94r now indicating the resultant control ampere turns for the amplifier 62. The curve 94e shows the variation of excitation of the brake Ew with speed for the fourth lowering position.

In the last lowering position, the contacts 79, 80, and 81 close causing the contactors 2A, 3A, 4A and 5A to close in sequence, the closure of the latter three contactors being dependent upon operation of the acceleration relays 3AR, 4AR, and 5AR. When the contactor 5A operates, its contacts b open to cause deenergization of the brake E.

By properly selecting the relative number of ampere turns provided by the windings 65b, 65c, 66b and 66c for the several lowering positions of the master switch MS1 as just described, the controller of Fig. 6 can cause the motor 10 and the brake Ew to provide the performance for the five lowering positions of the master switch MS1 as indicated by the curves 101 through 105 of Fig. 9 wherein torque at the common shaft of the motor and brake is plotted against lowering speed. Although numerical values for ampere turns and excitation have been used in Figs. 7 and 8, they have been used only for purposes of explanation, it being understood that other suitable numerical values can be used without departing from the invention.

The speed of the motor 10 when controlled by the controller of Fig. 6 can reach a speed close to synchronism while the master switch is in the first four lowering positions only if the excitation of the brake Ew should fail. The relay OS drops out to close its contacts when synchronous speed is approached, and, if the excitation of the brake Ew has failed, the normally closed contacts of the relay AD are also closed. Consequently the contactor 3A is energized through the emergency circuit from the conductor 35, the contacts of the relay AD, the contacts c of the contactor L, the contacts OS of the relay OS, and the operating winding of the contactor 3A to the conductor 36.

When the master switch MS1 is returned to the off position from a lowering position all of the contactors and relays are deenergized. The contacts b and c of the relay TR, however, remain closed for a time interval to maintain the connections between the transformer T1 and the amplifier 62 and the rectifier X1. All of the resistor R9 between its taps e and k are in series with the rectifier X1 at this time, and the tap k is so adjusted that the windings 65c and 66c provide sufficient positive ampere turns to cause the brake Ew to exert a large torque to assist the brake B in bringing the motor 10 to a stop.

Should the motor 10 be plugged while lowering as by moving the master switch MS1 into any of the hoisting positions while the motor 10 is operating in the lowering direction, the frequency of the secondary voltage at the terminals S2 and S3 increases above the primary frequency and the relay PR opens its normally closed contacts b and closes its normally open contacts c, d, and e. Opening of the contacts b of the relay PR prevents excitation of the windings 65b and 66b, closure of the contacts c of the relay PR insures that the terminal 62g of the amplifier 62 is connected to the upper terminal of the transformer T1, closure of the contacts d of the relay PR connects the tap e of the resistor R9 to the lower terminal of the transformer T1 through a circuit by-passing the now open auxiliary contacts c of the contactor H, and closure of the contacts e of the relay PR connects the tap j of the resistor R9 to the lower terminal of the rectifier X1. The windings 65c and 66c are thus energized to provide positive ampere turns which are limited by the amount of the resistor R9 between its taps E and j. The brake Ew accordingly exerts a strong retarding torque.

Should the motor 10 be plugged while hoisting as by moving the master switch MS1 into any of the lowering positions while the motor 10 is operating in the hoisting direction, the relay PR also operates to open its contacts b and to close its contacts c, d, and e. Opening of the contacts b of the relay PR prevents excitation of the windings 65b and 66b as before, and closure of the contacts c and e of the relay PR insures that the amplifier 62 is energized and that positive ampere turns are provided by the windings 65c and 66c, the exact value of the positive ampere turns being determined by which of the contacts 71 through 74, if any, are closed.

When the motor 10 approaches zero speed after plugging, the relay PR returns to its normal position and the excitation of the brake Ew is again controlled as described for operation when the motor is accelerated from rest.

In the controller of Fig. 6, the windings 65c and 66c are deenergized while the master is in the hoisting positions and the motor 10 is operating in the hoisting direction. Instead of maintaining complete deenergization of the windings 65c and 66c in the first two hoisting positions, it may be desirable to provide a small amount of excitation so that a low value of positive ampere turns is produced by the windings 65b and 66b. It is readily apparent that this can be accomplished by a simple and obvious modification of Fig. 6. If, on the other hand, it is desired to have the windings 65c and 65b provide negative ampere turns in the hoisting positions, the connection of Fig. 10 can be used wherein normally open auxiliary contacts e and f of the contactor L and normally open auxiliary contacts e and f of the contactor H are arranged to cause reversal of the polarity of the windings 65b and 66c between hoist and lower.

It should be noted in the various embodiments that variations in the voltage at the line conductors L1, L2 and L3 are accompanied by corresponding variations in the secondary voltage, so that the variations have little effect on the voltage at the eddy current brake winding Ew.

It will be understood that, although magnetic controllers operated in response to a master switch have been shown in the drawings, manual controllers can be used to give some of the advantages of this invention.

What is claimed is:

1. A motor and control system combination comprising an electric motor mechanically connected to a braking means which has a flux producing winding means and is operable to exert a braking torque in relation to the amount of power supplied to said winding means, control power means connected to a circuit of the motor and operative to provide control power at a potential that depends upon an electrical condition of said circuit of the motor, amplifying means electrically connected to said control power means and operative in response to the potential of the control power to produce amplified power at a potential of uniform polarity that depends in magnitude upon the potential of said control power, and means connecting said amplifying means to said winding means for supplying said amplified power to said winding means throughout the entire speed range of said motor.

2. A motor and control system combination comprising an electric motor having a circuit an electrical condition of which is dependent upon the speed of the motor and which motor is mechanically connected to a braking means which has a flux producing winding means and is operable to exert a braking torque in relation to the amount of power supplied to said winding means, control power means arranged to be connected to said circuit of the motor operative to provide control power at a potential that depends upon the speed of the motor, amplifying means electrically connected to said control power means and operative in response to the potential of said control power to produce amplified power at a potential of uniform polarity that depends in magnitude upon the potential of said control power, and means connecting said amplifying means to said winding means for supplying said amplified power to said winding means throughout the entire speed range of said motor.

3. The control system of claim 2 characterized in that the control power means is one which provides control power at a potential which decreases as the speed of the motor increases, and said amplifying means includes means for causing the potential of said amplified power to increase as the speed of the motor increases.

4. The control system of claim 2 characterized in that said amplifying means comprises a saturable core reactor having a main winding arranged to be supplied from a source of substantially constant voltage and having a control winding, said main winding is connected through a full-wave rectifier to said winding means, and the electrical connection between the amplifying means and said control power means is through said control winding.

5. A motor and control system combination comprising a polyphase wound rotor motor having an external secondary circuit and arranged to drive loads and to be driven by overhauling loads, selectively, and mechanically connected to a braking means having a flux producing winding means operable to exert a braking torque in relation to the amount of power supplied to the winding means, control power means arranged to be connected to said secondary circuit and operative to provide control power at a potential that depends upon an electrical condition of said secondary circuit, amplifying means electrically connected to said control power means and operative in response to the potential of said control power to produce amplified power at a potential of uniform polarity that depends in magnitude upon the potential of said control power, and means connecting said amplifying means to said winding means for supplying said amplified power to said winding means throughout the entire speed range of said motor.

6. The control system of claim 5 characterized in that said control power means is one which is operative when connected to said secondary circuit to provide control power at a potential that varies directly with the potential induced in said secondary circuit and said amplifying means is one which is operative to cause the potential of said amplified power to vary inversely at all times with the potential of said control power.

7. A control system in accordance with claim 1 characterized in that reference potential means is electrically connected to said amplifying means and, when energized, is operative to provide a substantially constant reference potential to said amplifying means, and the amplifying means is one in which the amplified power thereof depends in magnitude upon an electrical quantity which is a function of the potential of said control power and said reference potential.

8. A control system in accordance with claim 1 characterized in that reference potential means is electrically connected to said amplifying means and, when energized, is operative to provide a substantially constant reference potential to said amplifying means, and the amplifying means is one in which the amplified power thereof depends in magnitude upon the sum of said reference potential and the potential of said control power.

9. A control system in accordance with claim 1 characterized in that reference potential means is electrically connected to said amplifying means and, when energized, is operative to provide a substantially constant reference potential to said amplifying means, and the amplifying means is one in which the amplified power thereof depends in magnitude upon the difference between the potential of said control power and said reference potential.

10. A motor and control system combination comprising a polyphase wound rotor motor having an external secondary circuit and arranged to drive loads and to be driven by overhauling loads, selectively, and mechanically connected to a braking means having a flux producing winding means and operable to exert a braking torque in relation to the amount of power supplied to the winding means, control power means arranged to be connected to said secondary circuit and operative to produce control power at a potential that varies inversely with the speed of the motor, means for providing a substantially constant reference potential, amplifying means electrically connected to said control power means and operative in response to the potential of said control power to produce amplified power at a potential of uniform polarity that varies in magnitude inversely with the potential of the control power, and said amplifying means including a saturable core reactor means having an impedance winding and a pair of saturating windings, connections for exciting one of said saturating windings with said reference potential, connections for supplying said control power to the other of said saturating windings, and means connecting said amplifying means to said winding means for supplying said amplified power to said winding means throughout the entire speed range of said motor.

11. A control system in accordance with claim 10 characterized in that means are provided for adjusting the value of said reference potential.

12. A control system in accordance with claim 11 characterized in that means are provided to reverse the relative polarity of said reference potential and the potential of said control power.

13. A control system in accordance with claim 11 characterized in that an adjustable resistor is arranged to be connected in said secondary circuit and means for adjusting said secondary resistor is operative in predetermined coordinated relationship with said means for adjusting the value of said reference potential.

14. A motor and control system combination comprising a polyphase wound rotor motor having a secondary circuit, a braking means having a flux producing winding means and operable to exert a braking torque directly related to the voltage impressed on the winding means, a mechanical connection between said motor and said braking means, a magnetic amplifier including a saturable core reactor having an impedance winding and a pair of saturating windings, all of said windings being wound on a common saturable core, means connecting said impedance winding to a source of substantially constant alternating potential to cause an alternating current to flow through said impedance winding, said amplifier including rectifying means for producing a unidirectional potential of uniform polarity dependent upon the amount of alternating current flowing in said impedance winding, a first rectifier connected to said secondary circuit for producing a control potential of uniform polarity that varies inversely with the speed of said motor, a second rectifier connected to a power source for producing a substantially constant reference potential, means connecting said first rectifier to one of said saturating windings for magnetizing said core in relation to said control potential, means connecting said second rectifier to the other of said saturating windings for magnetizing said core in relation to said reference potential, said saturating windings being so wound on said core that the unidirectional potential produced by said amplifier varies directly with the speed of said motor, and said rectifying means being electrically connected to said winding means of said brake for impressing said unidirectional potential on said winding means throughout the speed range of said motor.

15. A motor and control system combination comprising a braking generator having a flux producing winding means and operable to exert a braking torque directly related to its speed of rotation and to the potential of the power supplied to the winding means, a polyphase wound rotor induction motor mechanically coupled to the braking generator and having a primary winding and a secondary winding which are connected to an external secondary circuit including a resistor, a control power means connected to said secondary circuit and operative when said motor is energized to provide control power at a potential that varies directly with the voltage induced in said secondary circuit and inversely with the speed of said motor, amplifying means electrically connected to said control power means and responsive to the potential of said control power to produce amplified power, said amplifying means including means operative to cause the potential of said amplified power to be of uniform polarity and to vary inversely with the potential of said control power, whereby the potential of said amplified power varies directly with the speed of said motor, and means connecting said amplifying means to said winding means so as to supply said amplified power to said winding means throughout the entire speed range of said motor and generator both when said motor is driving a load and said generator and when said motor and generator are driven by an overhauling load.

16. The motor and control system of claim 15 characterized in that means are provided for adjusting said resistor and the magnitude of the potential of said amplified power in steps concurrently in a manner such that a reduction in the resistance of said resistor is accompanied by a reduction in said potential.

References Cited in the file of this patent

UNITED STATES PATENTS

| Number | Name | Date |
| --- | --- | --- |
| 2,437,996 | Carnegie | Mar. 16, 1948 |
| 2,569,456 | Cushing et al. | Oct. 2, 1951 |
| 2,581,292 | Rathbun | Jan. 1, 1952 |
| 2,581,315 | Widdows et al. | Jan. 1, 1952 |
| 2,581,596 | Nims | Jan. 8, 1952 |